United States Patent
Abbott

(10) Patent No.: US 8,518,298 B2
(45) Date of Patent: Aug. 27, 2013

(54) EUTECTIC MIXTURES BASED UPON MULTIVALENT METAL IONS

(75) Inventor: Andrew Peter Abbott, Leicester (GB)

(73) Assignee: University of Leicester, Leicester (GB)

( * ) Notice: Subject to any disclaimer, the term of this patent is extended or adjusted under 35 U.S.C. 154(b) by 1066 days.

(21) Appl. No.: 11/994,382

(22) PCT Filed: Jul. 6, 2006

(86) PCT No.: PCT/GB2006/002515
§ 371 (c)(1),
(2), (4) Date: Sep. 3, 2008

(87) PCT Pub. No.: WO2007/003956
PCT Pub. Date: Jan. 11, 2007

(65) Prior Publication Data
US 2009/0194426 A1  Aug. 6, 2009

(30) Foreign Application Priority Data
Jul. 6, 2005 (GB) .................................. 0513804.5

(51) Int. Cl.
*C09K 3/00* (2006.01)
*C25D 3/00* (2006.01)

(52) U.S. Cl.
USPC ................. 252/183.13; 252/518.1; 252/521.1; 252/521.6; 205/234; 205/538; 205/560; 205/684

(58) Field of Classification Search
USPC ................... 252/183.13, 518.1, 521.2, 521.6; 205/234, 538, 560, 684
See application file for complete search history.

(56) References Cited

U.S. PATENT DOCUMENTS

| | | | | |
|---|---|---|---|---|
| 3,616,280 | A | | 10/1971 | Arnold |
| 4,624,753 | A | * | 11/1986 | McManis et al. .............. 205/234 |
| 4,624,754 | A | * | 11/1986 | McManis et al. .............. 205/234 |
| 4,624,755 | A | * | 11/1986 | McManis et al. .............. 205/234 |
| 5,855,809 | A | * | 1/1999 | Angell et al. ................ 252/62.2 |
| 6,787,019 | B2 | * | 9/2004 | Jacobson et al. ............. 205/406 |
| 7,037,559 | B2 | * | 5/2006 | Cooper et al. ................ 427/437 |
| 7,347,920 | B2 | * | 3/2008 | Wu et al. .................... 204/243.1 |
| 2004/0054231 | A1 | * | 3/2004 | Abbott et al. ................. 564/282 |
| 2004/0097755 | A1 | * | 5/2004 | Abbott et al. ................. 562/553 |

FOREIGN PATENT DOCUMENTS

WO  02/26701 A  4/2002

OTHER PUBLICATIONS

Abott et al., Green Chemistry, vol. 7, pp. 705-707 (published on the Web: Sep. 5, 2005).*

* cited by examiner

*Primary Examiner* — Porfirio Nazario Gonzalez
(74) *Attorney, Agent, or Firm* — LeClairRyan, a Professional Corporation

(57) ABSTRACT

There is provided a mixture having a freezing point of up to 50° C., formed by reaction between: (A) one molar equivalent of a salt of formula I $(M^{n+})(X^-)_n$ I or a hydrate thereof; and (B) from one to eight molar equivalents of a complexing agent comprising one or more uncharged organic compounds, each of which compounds has (i) a hydrogen atom that is capable of forming a hydrogen bond with the anion $X^-$; and (ii) a heteroatom selected from the group consisting of O, S, N and P that is capable of forming a coordinative bond with the metal ion $M^{n+}$, which reaction is performed in the absence of extraneous solvent, wherein M, $X^-$ mind a have meaning given in the description.

19 Claims, 4 Drawing Sheets

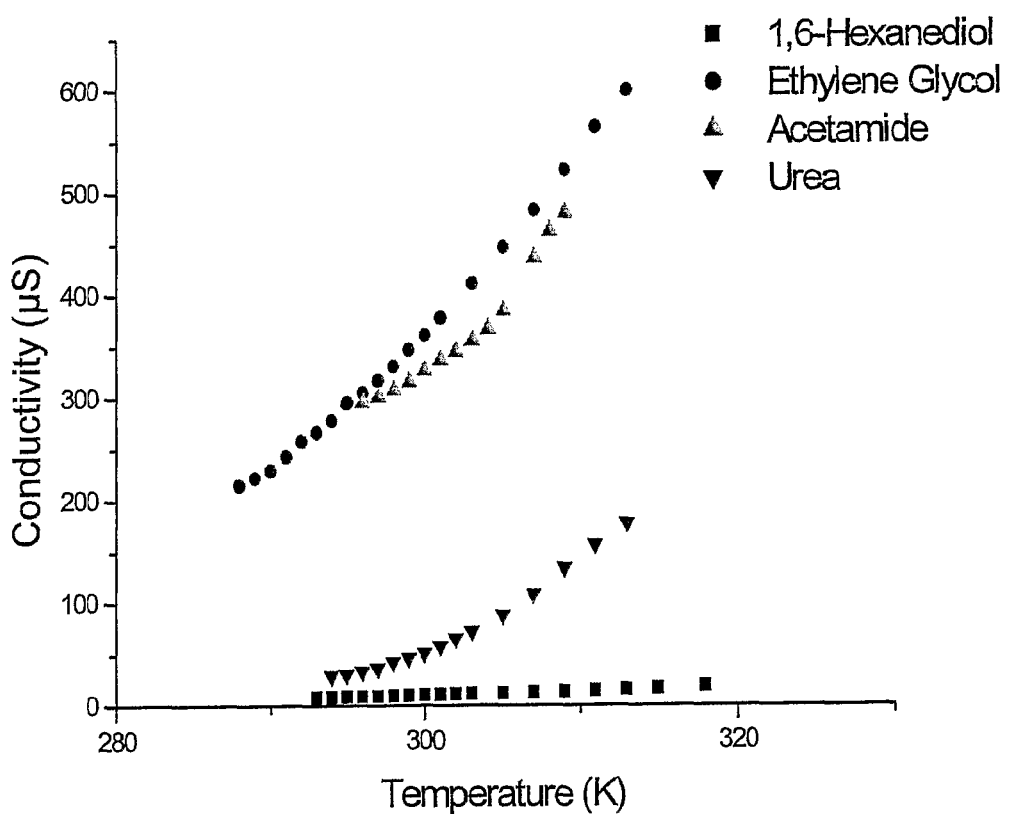
Figure 1. Conductivity as a function of temperature for four ionic liquids based upon ZnCl$_2$ (mixtures with urea, acetamide, ethylene glycol and 1,6-hexane diol).

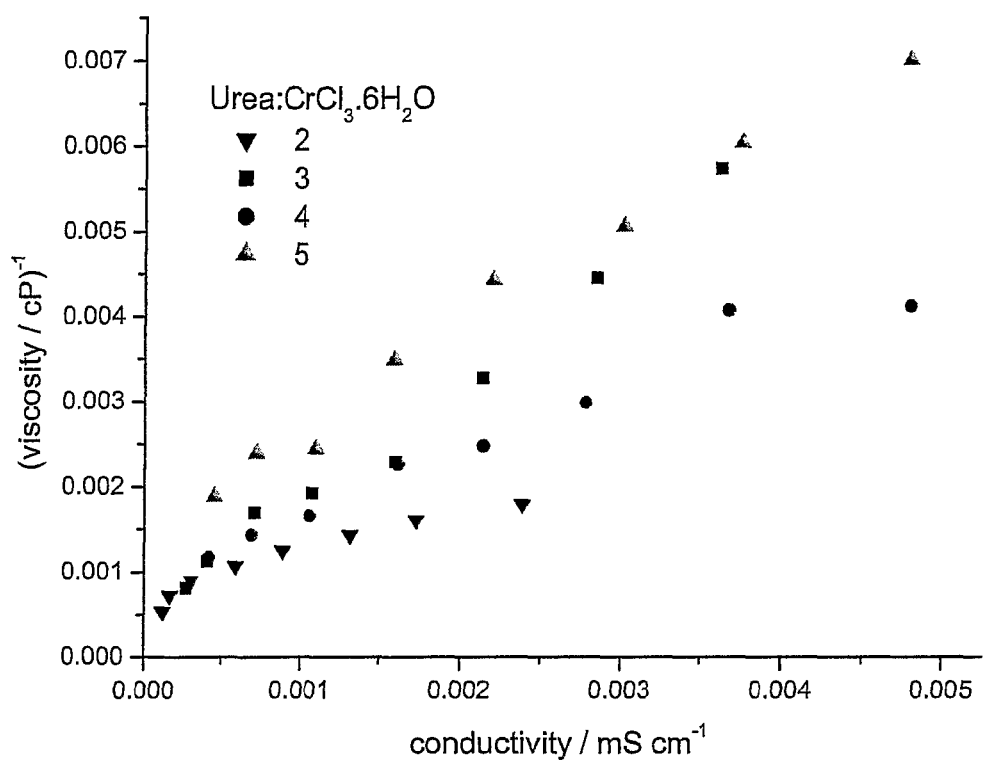
Figure 2. Conductivity and viscosity of urea / $CrCl_3.6H_2O$ mixtures as a function of composition and temperature.

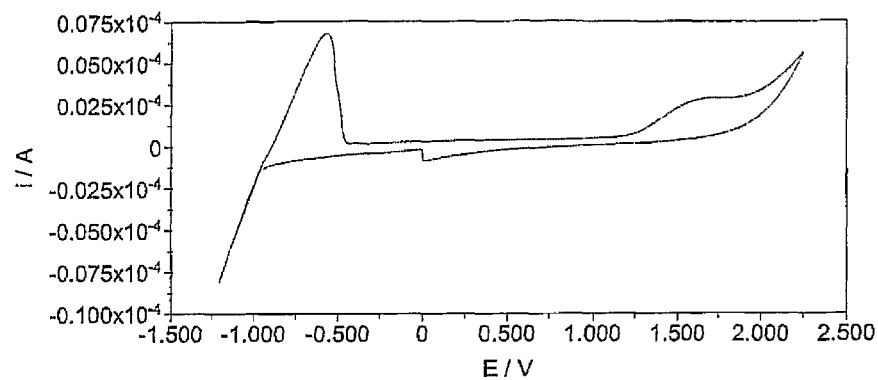
Figure 3A. Cyclic voltammogram of a Pt microelectrode in 7:2 urea : $ZnCl_2$.
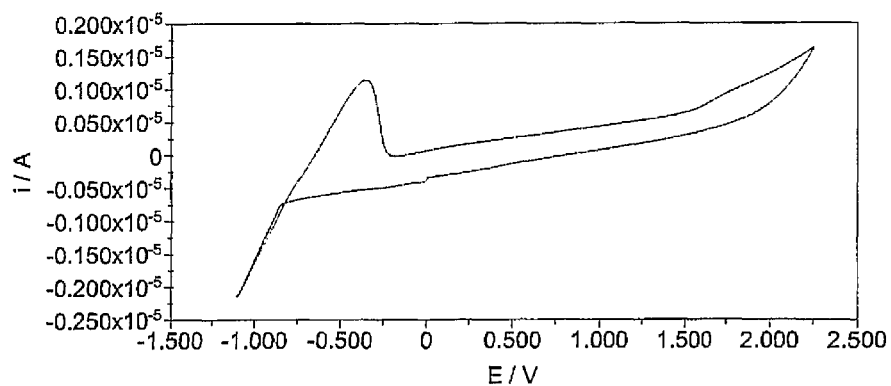
Figure 3B. Cyclic voltammogram of a Pt microelectrode in 4:1 acetamide : $ZnCl_2$.

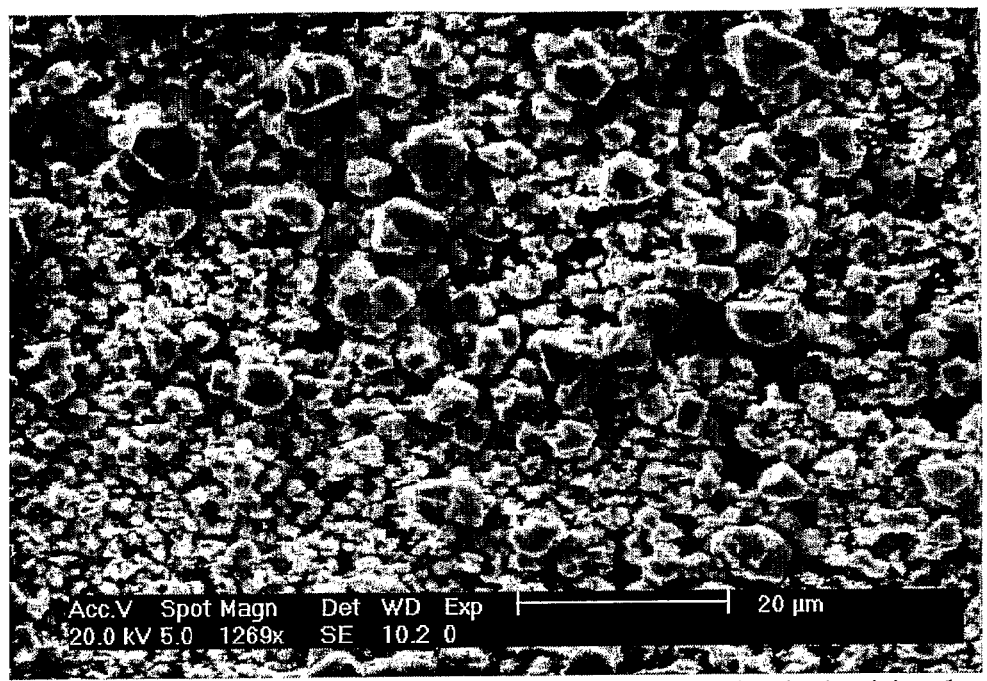
Figure 4A. Scanning electron micrograph of a zinc deposit obtained by the bulk electrolysis of 7:2 urea : $ZnCl_2$ at 90°C.
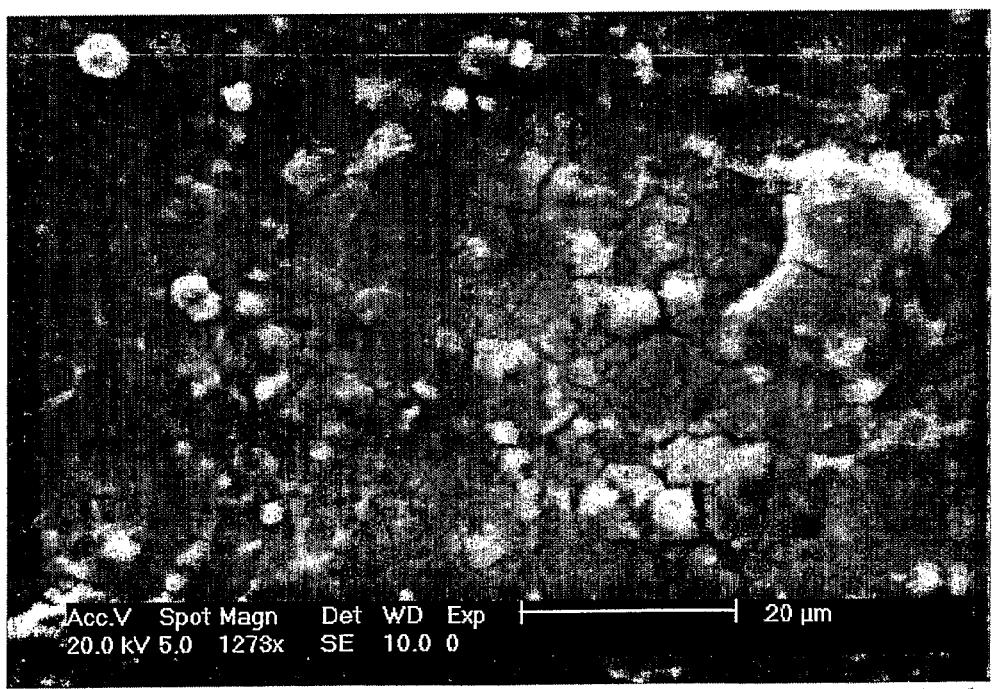
Figure 4B. Scanning electron micrograph of a chromium deposit obtained by the bulk electrolysis of 5:1 urea : $CrCl_3 \cdot 6H_2O$ at 50°C

EUTECTIC MIXTURES BASED UPON MULTIVALENT METAL IONS

This application is a national stage application under 35 U.S.C. §371 from PCT Application No. PCT/GB2006/002515, filed Jul. 6, 2006, which claims the priority benefit of Great Britain Application No. 0513804.5, filed Jul. 6, 2005.

FIELD OF THE INVENTION

This invention relates to a new mixture that is a low temperature (e.g. ambient temperature or thereabouts) ionic liquid, as well as to uses for and methods of preparation of such mixtures.

BACKGROUND AND PRIOR ART

Ionic compounds are typically crystalline solids that have a high melting point. These properties of ionic compounds derive from strong electrostatic interactions between ions of opposite charges, which provides a large enthalpic driving force for the formation of ordered lattices (in which lattices the ionic interactions can be maximised).

However, there are certain ion-based systems that remain in the molten state at relatively low temperatures (e.g. about ambient temperature), and are therefore termed "ionic liquids". The fluid state in these systems is typically maintained by the use of cations and/or anions that:
(a) are based upon, or contain, an organic molecule; and
(b) have a large radius.

The large radius of the cation and/or anion decreases the magnitude of the charge-charge interaction between the ions, thereby reducing the driving force for the system to convert to an ordered lattice. Also, in these systems, the cations and anions are almost always mono-charged, so as to further minimise the ionic interactions.

Ionic liquids have a number of useful and interesting properties. For example, due to their characteristically very low vapour pressure, they represent an attractive alternative to conventional (uncharged) solvent systems, which can produce hazardous vapours. Further, they have particular application as electrolytes or as solvents for ionic compounds (such as metal salts) and thus have utility, for example in electrochemical systems (such as fuel cells, electrochromic devices and photovoltaic devices) and electrochemical processes (such as electrodeposition and electropolishing).

In the known ionic liquids, various approaches are utilised to form the requisite large cations or anions.

For example, a metal salt that contains a Lewis acidic metal ion can be reacted with an ionic compound that contains a large, organic cation and an anion that can coordinate to the metal ion. In this way, a fluid system is formed that contains a metal-based anion and the organic cation. Examples of such systems include:
(a) trimethylphenylammonium chloride or 1-ethyl-3-methylimidazolium chloride/$AlCl_3$ (as described, for example, in U.S. Pat. No. 4,764,440, U.S. Pat. No. 5,525,567, FR 2 611 700, FR 2 626 572, EP 0 838 447 and WO 95/21872), which provide liquids containing $AlCl_4^-$ anions and either imidazolium or trimethylphenylammonium cations;
(b) tertiary ammonium halide or quaternary ammonium or phosphonium salt/metal halide, where the metal is, for example, zinc or aluminium (as described in U.S. Pat. No. 5,731,101 and U.S. Pat. No. 5,892,124); and
(c) quaternary ammonium halide/optionally hydrated metal salt, where the metal is, for example, iron, zinc or tin (as descried in WO 00/56700 and WO 02/26381) and where the resulting ionic liquid is relatively water-insensitive.

Another approach is to generate a large anion by utilising a molecule that "solvates" (i.e. hydrogen-bonds to) the anion of a crystalline ionic compound. Thus, for example, it is know that urea, which has hydrogen bond donor properties, can be mixed with highly ionic halide or nitrate salts of alkali metals to provide an ionic liquid (as descried, for example, in *Thermochim Acta* 111, 37-47 (1987) and ibid. 127, 223-236 (1988)). Such ionic liquids have been utilised in electrochemical processes (e.g. the electroreduction of Co(II) or Ni(II), as described in *Rare Metals* 19(3), 237-241 (2000)).

Other known ionic liquids containing hydrogen bond donors (such as urea) include those described in WO 02/26710, which are formed by reaction between a quaternary ammonium salt and a hydrogen bond donor. The use of such ionic liquids for the dissolution of metal salts and oxides is also described.

Although urea and thiourea are known to interact with various metals and anions in solution (see, for example, *Science* 123, 897 (1956) and *J. Am. Client. Soc.* 79, 4296-4297 (1957)), there has, to the knowledge of the applicant, never been a suggestion that it would be possible to prepare an ionic liquids by reacting urea with a salt of a multiply charged metal ion.

Indeed, it would be counter-intuitive to attempt to prepare such an ionic liquid, as the metal ion either:
(a) in highly ionic salts (e.g. those of alkaline earth metals) would be likely to dissociate from the anions, thereby forming a multiply-charged cation (which would have increased charge-charge interactions with the surrounding anions, thus providing a greater driving force for the formation of an ordered lattice, i.e. crystalline material); or
(b) in less ionic salts (e.g. those of the transition metals) would be unlikely to dissociate from the anions, thus not providing the separation of cations and anions required for the formation of an ionic liquid.

The applicant has now surprisingly discovered that ionic liquids may be formed by mixing a neutral organic molecule such as urea with a metal salt that is weakly ionic and/or that contains a multiply-charged metal ion.

DESCRIPTION OF THE INVENTION

According to the invention, there is provided a mixture having a freezing point of up to 50° C., formed by reaction between:
(A) one molar equivalent of a salt of formula I

or a hydrate thereof;
wherein
M represents one or more metallic elements selected from the group consisting of Mg, Ca, Cr, Mn, Fe, Co, Ni, Cu, Zn, Ga, Ge, In, Sn, Ti, Pb, Cd, Hg and Y,
$X^-$ is one or more monovalent anions selected from the group consisting of halide, nitrate and acetate and
n represents 2 or 3; and
(B) from one to eight molar equivalents of a complexing agent comprising one or more uncharged organic compounds, each of which compounds has
(i) a hydrogen atom that is capable of forming a hydrogen bond with the anion X); and
(ii) a heteroatom selected from the group consisting of O, S, N and P that is capable of forming a coordinative bond with the metal ion $M^{n+}$,
which reaction is performed in the absence of extraneous solvent,
and which mixture is referred to hereinafter as "the mixture of the invention".

The term "uncharged", when used herein in relation to complexing agents, refers to organic molecules (compounds) that do not bear a permanent positive or negative (electrostatic) charge on any atom within the molecule. In this respect, uncharged organic compounds are those that comprise a single, covalently-bonded molecule and that are not separated into cationic and anionic components.

When used herein, the term "extraneous solvent" refers to an inorganic or organic solvent system that is other than the essential complexing agent (component (B)) or the water molecules that may be present in hydrates of the salt of formula I.

The freezing point of the mixture, as mentioned above, is up to 50° C., but may, in certain embodiments of the invention, be up to 45, 40, 35, 30 or, particularly, 25, 20, 15 or 10° C. (for example from −35 or, particularly, −30° C. to any of the above-mentioned upper limits). In this respect, the freezing point of a mixture is defined as the temperature at which solidification is first observable when the mixture is allowed to cool from a higher temperature.

Hydrates of the salt of formula I that may be mentioned include:
(i) monohydrates of $CaX_2$ (e.g. $CaCl_2$, $Ca(OAc)_2$ or $Ca(NO_3)_2$);
(i) dihydrates of $CaX_2$ (e.g. $CaCl_2$), $MnX_2$ (e.g. $Mn(OAc)_2$), $CuX_2$ (e.g. $CuCl_2$), $ZnX_2$ (e.g. $Zn(OAc)_2$), $CdX_2$ (e.g. $Cd(OAc)_2$) and $SnX_2$ (e.g. $SnCl_2$);
(ii) trihydrates of $CuX_2$ (e.g. $Cu(NO_3)_2$) and $PbX_2$ (e.g. $Pb(OAc)_2$);
(iii) tetrahydrates of $MgX_2$ (e.g. $Mg(OAc)_2$), $CaX_2$ (e.g. $Ca(NO_3)_2$), $MnX_2$ (e.g. $MnCl_2$ or $Mn(NO_3)_2$), $FeX_2$ (e.g. $FeCl_2$), $NiX_2$ (e.g. $Ni(OAc)_2$), $ZnX_2$ (e.g. $Zn(NO_3)_2$) and $CdX_2$ (e.g. $Cd(NO_3)_2$);
(iv) hexahydrates of $MgX_2$ (e.g. $MgCl_2$ or $Mg(NO_3)_2$), $CaX_2$ (e.g. $CaCl_2$), $CrX_3$ (e.g. $CrCl_3$), $FeX_3$ (e.g. $FeCl_3$), $CoX_2$ (e.g. $CoCl_2$ or $Co(NO_3)_2$) and $NiX_2$ (e.g. $NiCl_2$ or $Ni(NO_3)_2$); and
(v) nonahydrates of $Cr(NO_3)_3$ and $Fe(NO_3)_3$.

In one embodiment of the invention, M represents more than one (e.g. two) metallic elements selected from the list at (A) above. Alternatively, M represents one or more (e.g. two, or in a particular embodiment, one) metallic elements selected from the group consisting of Cr, Mn, Fe, Co, Ni, Cu, Zn and Sn (e.g. Cr, Fe, Ni, Zn and Sn or, particularly, Cr, Zn and Sn).

In an alternative embodiment of the invention, M represents one or more (e.g. one) metallic elements selected from Mg and Ca. In this embodiment of the invention, the salt of formula I is preferably provided as a hydrate (e.g. a hexahydrate).

When the salt of formula I is anhydrous, the melting point of that salt is, in a particular embodiment, 400° C. or less (e.g. from 75 to 400° C., such as from 100 to 350° C.).

When the salt of formula I is in the form of a hydrate, the melting point of that salt is, in a particular embodiment, 100° C. or less (e.g. from 40 to 100° C.).

In a particular embodiment of the invention, the anion $X^-$ is one or more (e.g. one) anions selected from the group consisting of chloride, nitrate and acetate (e.g. chloride and nitrate).

The complexing agent (component (B)), in one embodiment of the invention, consists of one or more uncharged organic compounds, each of which compounds has
(i) a hydrogen atom that is capable of forming a hydrogen bond with the anion $X^-$; and
(ii) a heteroatom selected from the group consisting of O, S and N (e.g. an O atom) that is capable of forming a coordinative bond with the metal ion $M^{n+}$.

In this respect, and in another particular embodiment of the invention, the complexing agent consists of one or more compounds (e.g. one compound) of formula II and/or formula III,

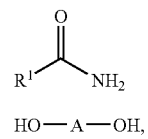

$$HO-A-OH,$$ III wherein
$R^1$ represents H, $C_{1-4}$ alkyl (which latter group is optionally substituted by one or more F atoms), or $N(R^2)R^3$;
$R^2$ and $R^3$ independently represent H or $C_{1-4}$ alkyl (which latter group is optionally substituted by one or more F atoms);
A represents $C_{2-10}$ alkylene optionally
 (i) substituted by one or more substituents selected from F, OH, SH and $N(R^4)R^5$, and/or
 (ii) interrupted by one or more groups selected from O, S and $NR^6$; and
$R^4$ to $R^6$ independently represent H or $C_{1-4}$ alkyl (which latter group is optionally substituted by one or more substituents selected from F and OH);
provided that the compound of formula III does not contain any C-atoms that are bonded to more than one atom selected from the group O, S and N.

Unless otherwise specified, allyl groups as defined herein may be straight-chain or, when there is a sufficient number (i.e. a minimum of three) of carbon atoms be branched-chain, and/or cyclic. Further, when there is a sufficient number (i.e. a minimum of four) of carbon atoms, such alkyl and alkoxy groups may also be part cyclic/acyclic.

Further, unless otherwise specified, alkylene groups as defined herein may be straight-chain or, when there is a sufficient number (i.e. a minimum of two) of carbon atoms, be branched-chain.

Compounds of formula II that may be mentioned include those in which $R^1$ represents H, $CH_3$, $CF_3$, $NH_2$, $N(H)CH_3$ or $N(CH_3)_2$. In this respect, particular compounds of formula II that may be mentioned include acetamide and urea.

Compounds of formula III that may be mentioned include those in which A represents $C_{2-6}$ n alkylene or $C_{3-4}$ alkylene substituted by one or two OH groups. In this respect, particular compounds of formula III that may be mentioned include 1,2-ethanediol (ethylene glycol), 1,3-propanediol, 1,4-butanediol, 1,5-pentanediol, 1,6-hexanediol and 1,2,3-propanetriol (i.e. glycerol).

Other embodiments of the invention that may be mentioned include those in which each of the one or more compounds of the complexing agent (component (B)) has:
(i) a melting point greater than −20° C. (e.g. from −20 to 200, 180, 160 or, particularly, 140° C.);
(ii) a molecular weight of less than 200 g/mol (e.g. from 45 to 200, 180, 160, 140 or, particularly, 120 g/mol); and/or
(iii) if liquid at a temperature of 25° C., a viscosity at that temperature (as determined, for example, by measuring by torque resistance to an immersed spindle running at constant speed) and in the pure state of greater than 50 centipoise (cP) (e.g. from 50 to 30,000 cP).

The mixture of the invention may be prepared by mixing the metal salt of formula I (component (A)) with the complexing agent (component (B)). In order to facilitate preparation of the mixture, the components (A) and (B) may be heated together at elevated temperature, such as any temperature from 35 to 200° C. (e.g. from 60 to 100° C., such as 80° C.).

As stated above, the mixture of the invention contains one molar equivalent of the metal salt of formula I (component (A)) and from one to eight molar equivalents of the complexing agent (component (B)). However, in a particular embodiment of the invention, the molar ratio of component (A) to component (B) is any value in the range from 2:3 to 1:7 (e.g. any value in the range from 1:2 to 1:5).

In a particular embodiment, the mixture of the invention, if liquid at 25° C., has a viscosity at that temperature (as determined by measuring by torque resistance to an immersed spindle running at constant speed) of below 15,000 cP (e.g. below 12,000, 10,000, 8,000, 6,000, 4,000 or, particularly, 2000 cP, such as in the range from 25, 50 or 100 cP to any of the above-mentioned upper limits). When component (B) is an amide (e.g. acetamide), a particular embodiment relates to a mixture of the invention in which, if liquid at 25° C., the viscosity of the mixture at that temperature is below 1000 cP (e.g. below 500, 300, 200 or, particularly, 100 cP, such as in the range of 25 or 50 cP to any of the above-mentioned upper limits).

The conductivity of the mixture of the invention will depend, amongst other things, upon the specific metal salt(s) and complexing agent(s) employed to form the mixture. However, in a particular embodiment, the mixture of the invention, if liquid at 25° C., has a conductivity at that temperature of any value in the range from 1 to 10,000 microsiemens ($\mu$S).

Other important properties of the mixture of the invention are surface tension and bulk density. In this respect, further embodiments relate to a mixture of the invention in which, if liquid at 25° C. has:
(a) a surface tension (as measured, for example, by using a ring or plate tensiometer) at 25° C. of any value in the range from 30 to 100 mN/m (e.g. any value in the range from 45 to 75 mN/m); and/or
(b) a bulk density at 25° C. of any value in the range from 1.25 to 1.75 g/cm$^3$ (such as any value in the range from 1.35 to 1.65 g/cm$^3$).

The values of viscosity, conductivity, surface tension and bulk density mentioned above apply to all mixtures of the invention that are liquid at 25° C. However, in a particular embodiment, these values apply to the deep eutectic mixture (i.e. the mixture of components (A) and (B) having the lowest freezing point within the range of molar ratios (component (A) to component (B)) of from 1:1 to 1:8).

In a further embodiment of the invention, there are provided mixtures of the invention, as defined hereinbefore, to which additives have been added (after the mixtures of the invention, without additives, have been formed). Additives that may be mentioned in this respect include those modifying electrochemical properties (e.g. conductivity or redox potentials) or physicochemical properties (e.g. viscosity or colour) of the mixtures of the invention. Specific additives therefore include: diluents (to decrease viscosity) such as water or methyl ethyl ketone; electrolytes (to increase conductivity) such as lithium chloride; and brighteners (to modify the reduction potential of the metal or adsorb at the electrode interface) such as ethylene diamine.

Without wishing to be bound by theory, it is believed that the mixtures of the invention possess low freezing points (i.e. they are low temperature ionic liquids) due to the unexpected occurrence of a disproportionation process when the metal salt of formula I is contacted with the one to eight molar equivalents of the complexing agent. That is, it is believed that the complexing agent induces the metal salt $(M^{n+})(X^-)_n$ to disproportionate into species based upon:
(a) $[(M^{n+})(X^-)_{n-1}]^+$ cations; and
(b) $[(M^{n+})(X^-)_{n+1}]^-$ anions,
either or both of which ions may then be "solvated" by the complexing agent (through direct coordination to the metal ion via a donor heteroatom and/or through hydrogen bonding).

The mixtures according to the invention may be utilised for a wide range of applications, for example those where dissolution of metal salts is desired. Specific applications that may be mentioned include the uses of the mixtures of the invention as electrolytes in electrochemical devices (such as batteries or fuel cells), in photovoltaic or electrochromic devices, and as solvents for electrochemical reactions, in particular electrochemical deposition, electropolishing or electro-refining. Further, the ability of the mixtures of the invention to dissolve metal-containing ionic compounds (e.g. metal salts and metal oxides), as well as their ability to conduct electricity, makes the mixtures particularly suitable for use in electrochemical metal recovery processes.

Other applications of the mixtures of the invention include their use as solvent systems for inorganic and organic compounds (thus meaning that the mixtures may be used, for example, as solvent systems in which chemical reactions are performed, or into which compounds are extracted from an immiscible fluid phase).

Further, due to the presence of potentially reactive metal ions in the mixtures of the invention, those mixtures may (either alone or after the addition of further metal salts) also be employed as catalysts or as chemical reagents.

Thus according to further aspects of the invention, there is provided:
(i) the use of the mixture of the invention, as hereinbefore defined, as a solvent, as an electrolyte, as a reagent or as a catalyst;
(ii) a method of carrying out an electrolytic reaction (e.g. an electroplating or an electropolishing reaction), which method comprises employing as a solvent for the electrolytic reaction the mixture of the invention, as hereinbefore defined;
(iii) a method of electroplating or electropolishing a conductive (e.g. metal) article, which method comprises immersing the article in the mixture of the invention, as hereinbefore defined, and applying an appropriate electrical potential (e.g. for electroplating, a reducing potential) to the article;
(iv) a method of forming a solution of a solute, which method comprises dissolving the solute in the mixture of the invention, as hereinbefore defined; and
(v) a method of recovering a metal from a metal salt or metal oxide, which method comprises forming a solution of the metal salt or metal oxide in the mixture of the invention, as hereinbefore defined, and electrolysing the resulting solution to recover the metal.

When the mixtures of the invention (either with or without additives) comprise two or more metals, it will be appreciated by those skilled in the art that those mixtures may be used for the electrodeposition of alloys. Thus, according to still further aspects of the invention, there is provided:
(I) the use of a mixture of the invention in which M represents two or more metallic elements for the electrodeposition of an alloy; and
(II) a method for the electrodeposition of an alloy on a conductive article, the method comprising immersing the article in a mixture of the invention in which M represents two or more metallic elements and applying a reducing potential to the article.

When the mixtures of the invention are contacted with substances (e.g. metals) that can be oxidised by $[(M^{n+})(X^-)_{n-1}]^+$ cations, those skilled in the art will appreciate that the mixtures of the invention can be utilised as oxidants. Thus, according to still further aspects of the invention, there is provided:
(A) the use of a method of the invention as an oxidant (e.g. for a metal); and
(B) a method of oxidising a first metal, the method comprising contacting said first metal with a mixture of the invention in which M represents one or more metallic elements including at least one metallic element that, when in the form $M^{n+}$, is capable of oxidising the first metal (i.e. at least one metallic element that, when in the form $M^{n+}$, has a greater oxidising potential than the oxidised form of the first metal).

When the mixture of the invention comprises a metallic element that has at least two stable cationic forms (e.g. $M^{n+}$ and $M^{(n-1)+}$), using the mixture of the invention to oxidise a metal may result in a mixture in which the oxidised metal and the reduced metallic element (e.g. $M^{(n-1)+}$) both become part of a liquid mixture (i.e. compounds of the resulting ionic liquid). In this situation, the mixture of the invention can be used to "strip" a metal from a surface. Thus, particular embodiments of the invention relate to:

(i) the use of a mixture of the invention as a reagent for stripping a metal from a surface (e.g. a metal having, in its oxidised form, a lower oxidising potential than at least one of the metallic elements, in the form $M^{n+}$, in the mixture of the invention); and (ii) a method of stripping a first metal form a surface, the method comprising contacting the metal with a mixture of the invention in which M represents one or more metallic elements including at least one metallic element that, when in the form $M^{n+}$, is capable of oxidising the first metal through being reduced to a cationic form with a lower charge (i.e. to form $M^{m+}$, where m is a positive integer that is smaller than n).

Specific metallic elements that may be mentioned in this respect (i.e. elements that can, in a high oxidation form, act as oxidants, thereby being reduced to a cationic form having lower charge) include Fe (which can exist in stable (III) and (II) oxidation states).

Specific complexing agents that may be employed in oxidising mixtures of the invention include compounds of formula II (e.g. compounds of formula II in which $R^1$ represents $C_{1-4}$ alkyl, such as acetamide).

Specific metals that may be oxidised by the oxidising mixtures of the invention include those having high reducing potentials, such as Sn, Cr, Al, Ti and Ni.

As an example, stripping metals from surfaces may be applied to the manufacture of printed circuit boards. Thus, a mixture of the invention containing a metallic element in an oxidising form (e.g. a mixture formed from acetamide and $FeCl_3$) could be used to strip a layer of Sn from a surface, wherein the overall redox reaction would be as follows:

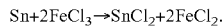

$$Sn + 2FeCl_3 \rightarrow SnCl_2 + 2FeCl_2.$$

If necessary, the resulting Fe(II) could be reoxidised to Fe(III) by using inert electrodes and applying a potential such that the Sn is deposited and the iron reoxidised.

When used as catalysts, mixtures of the invention that may be mentioned include those comprising a coordinatively labile, Lewis acidic metal ion (such as $Cr^{3+}$, $Mn^{2+}$, $Co^{2+}$, $Cd^{2+}$, $Sn^{2+}$ or, particularly, $Fe^{3+}$ or $Zn^{2+}$). Reactions that may be catalysed by using such mixtures include those that can be catalysed by Lewis acidic metal ions, such as Diels Alder cycloaddition (coupling of diene to dienophile), Fischer indole synthesis (cyclisation of aryl hydrazones) and Friedel Crafts alkylation or acylation (reaction between aromatic groups and alkyl or acyl halides).

Mixtures of the invention may have the advantage that, compared to ionic mixtures of the prior art that are liquid at low temperatures, they have a lower freezing point, are less viscous, are more conductive, are less dense and/or have a lower surface tension.

Further, a particular advantage of mixtures of the invention is that, unlike many ionic liquid systems of the prior art, they include metal-containing species that are cationic (e.g. without wishing to be bound by theory, species based upon $[(M^{n+})(X^-)_{n-1}]^+$, optionally bound to one to three molecules of complexing agent). Such cationic species are considerably easier to reduce (for electrostatic reasons) than are corresponding anionic species (such as those based upon $[(M^{n+})(X^-)_{n+1}]^-$), and so give rise to improved current efficiencies and diminished energy expenditure in the electrochemical reduction of $M^{n+}$ to the metallic element (e.g. in an electrodeposition process).

In addition to the above, mixtures of the invention, when used in electrodeposition and electropolishing processes, have the advantage that they obviate the need for the use of toxic and corrosive mineral acid electrolytes. As current efficiencies with such prior art electrolytes are low due to extensive hydrogen production, the mixtures of the invention also provide for greatly improved energy efficiency in electrochemical reduction process (compared to corresponding processes carried out in the in the presence of mineral acid electrolytes).

The avoidance of hydrogen production also has significant health and safety advantages (as hydrogen is an explosion risk and its production can raise "mists" of toxic and corrosive electrolyte around the electroplating/electropolishing tank), as well as product quality advantages (as hydrogen can cause embrittlement of the deposited metallic layer).

BRIEF DESCRIPTION OF THE FIGURES

FIG. 1 Depicts a plot of the conductivity of four zinc chloride-based mixtures of the invention as a function of temperature. The four mixtures are:
(i) urea: $ZnCl_2$ (7:2);
(ii) acetamide: $ZnCl_2$ (4:1);
(iii) ethylene glycol: $ZnCl_2$ (4:1); and
(iv) 1,6-hexanediol: $ZnCl_2$ (3:1).

FIG. 2 Depicts a plot of inverse viscosity as a function of conductivity (varied by means of changes in temperature) for four ionic liquids based upon chromium(III) chloride hexahydrate. The four ionic liquids are urea: $CrCl_3.6H_2O$ at molar ratios of 2:1, 3:1, 4:1 and 5:1.

FIG. 3 Depicts cyclic voltammograms for:
(i) a urea: $ZnCl_2$ (7:2) eutectic (FIG. 3A); and
(ii) an acetamide: $ZnCl_2$ (4:1) eutectic (FIG. 3B).

FIG. 4 Depicts scanning electron micrographs for:
(i) a zinc deposit obtained by the bulk electrolysis of a urea $ZnCl_2$ (7:2) eutectic (FIG. 4A); and
(ii) a chromium deposit obtained by the bulk electrolysis of a urea: $CrCl_3.6H_2O$ (5:1) eutectic (FIG. 4B).

Certain embodiments of the invention are illustrated by way of the following examples.

EXAMPLES

General Experimental Procedures

The complexing agents urea, acetamide and trifluoroacetamide (which were all utilised in >99% purity) were dried under vacuum prior to use. Metal salts and allylene glycols (again all utilised in >99% purity) were used as received.

Preparation of ionic liquids was assumed to be complete when a homogeneous liquid (the eutectic mixture) was formed. After being prepared (under heating), the liquids were cooled at a rate of 1° C. $min^{-1}$ and the freezing point was taken as the temperature at which the first solid was observed to form.

Viscosities were determined using a Brookfield DV-E viscometer fitted with a thermostatted jacket.

Conductivities (and their temperature dependence) were determined using a Jenway 4071 conductivity meter with temperature and conductivity probes.

Surface tension measurements were taken with a Krüss K11 tensiometer equipped with a thermostatted jacket.

Voltammetry and chronoamperometry were carried out using an Autolab PGSTAT12 potentiostat controlled with GPES software. A three-electrode system consisting of a platinum microelectrode ($5 \times 10^{-4}$ cm radius), a platinum counter electrode and a chromium wire reference electrode were used. The working electrode was polished with 0.3 μm alumina paste, rinsed and dried prior to all measurements. Electrochemical measurements were performed at 25° C. and a potential scan rate of 20 mVs$^{-1}$ was used in voltammetric experiments unless otherwise stated.

The effect of current density on chromium deposit morphology was determined using a Hull Cell. Two nickel plates were abraded with glass paper (P600), degreased using hexane and dried. Bulk electrolysis experiments were performed using a Thurlby Thander power supply. Following electrolysis the cathode was washed with deionised water and dried. Surface analysis was carried out using scanning electron microscopy (SEM) and energy dispersive analysis by X-rays (EDAX).

Preparation and Use of Mixtures of the Invention

Example 1

Zinc chloride was mixed with urea in various molar ratios and heated to 80-C. Upon cooling the mixtures remained liquid at ambient temperature when the molar ratio of urea to $ZnCl_2$ was between 3 and 4. The eutectic mixture was determined to be 7 urea to 2 $ZnCl_2$.

$T_f = 9°$ C.
MS[−FAB]: 171 $[ZnCl_3]^-$, 307 $[Zn_2Cl_5]^-$ and 442 $[Zn_3Cl_7]^-$.
MS[+FAB]: 159 $[ZnCl(urea)]^+$, 219 $[ZnCl(urea)_2]^+$ and 279 $[ZnCl(urea)_3]^+$.
Viscosity (25° C.)=11340 cP.
Conductivity (25° C.)=35-45 μS.
Density (g/cm$^3$) at 25° C.=1.63.
Surface tension (mN/m) at 25° C.=72.

Example 2

Zinc chloride was mixed with acetamide in various molar ratios and heated to 80° C. The eutectic mixture was determined to be 4 acetamide to 1 $ZnCl_2$.

$T_f = -16°$ C.
MS[−FAB]: 171 $[ZnCl_3]^-$, 307 $[Zn_2Cl_5]^-$ and 442 $[Zn_3Cl_7]^-$.
MS[+FAB]: 158 $[ZnCl(acetamide)]^+$, 217 $[ZnCl(acetamide)_2]^+$ and 276 $[ZnCl(acetamide)_3]^+$.
Conductivity (25° C.)=325-335 μS Density (g/cm$^3$) at 25° C.=1.36.
Surface tension (mN/m) at 25° C.=53.

Example 3

Zinc chloride was mixed with ethylene glycol in various molar ratios and heated to 80° C. The eutectic mixture was determined to be 4 ethylene glycol to 1 $ZnCl_2$.

$T_f = -30°$ C.
MS[−FAB]: 171 $[ZnCl_3]^-$, 307 $[Zn_2Cl_5]^-$ and 442 $[Zn_3Cl_7]^-$.
MS[+FAB]: 161 $[ZnCl(ethylene glycol)]^+$, 223 $[ZnCl(ethylene glycol)_2]^+$.
Conductivity (25° C.)=360-370 μS
Density (g/cm$^3$) at 25° C.=1.38.
Surface tension (mN/m) at 25° C.=56.9.

Example 4

Zinc chloride was mixed with 1,6-hexanediol in various molar ratios and heated to 80° C. The eutectic mixture was determined to be 3 hexanediol to 1 $ZnCl_2$.

$T_f = -23°$ C.
MS[−FAB]: 171 $[ZnCl_3]^-$, 153 $[1,6-hexanediol(Cl)]^-$, 307 $[Zn_2Cl_5]^-$ and 442 $[Zn_3Cl_7]^-$.
MS[+FAB]: 473 $[Zn_2Cl_3(1,6-hexanediol)_2]^+$.
Conductivity (25° C.)=5-10 μS
Density (g/cm$^3$) at 25° C.=1.45.
Surface tension (mN/m) at 25° C.=49.

Example 5

$SnCl_2$ and $FeCl_3$ were found to form room temperature eutectics, in a similar manner to $ZnCl_2$, with urea, acetamide, ethylene glycol and 1,6-hexanediol. These eutectic mixtures were prepared using procedures analogous to those described in Examples 1 to 4 above.

Example 6

The 7 urea:2 $ZnCl_2$ and 4 acetamide:1 $ZnCl_2$ mixtures described in Examples 1 and 2 above were studied using cyclic voltammetry (see FIG. 3A for the urea system). A signal for the electrodeposition of Zn was observed, together with an anodic signal showing that the zinc could be electrochemically stripped from the surface.

Constant voltage depositions at 3 V and 90° C. for 1 hour produced 3 μm thick, dull metallic deposits which were shown to be pure zinc by EDAX measurements. The morphology of the deposit obtained from the urea-based system is shown in FIG. 4A.

Example 7

The following cell was constructed:

Zn|$ZnCl_2$(0.2)urea(0.8)||$FeCl_3$(0.2)Urea(0.8)|Pt and a cell voltage of 1.80 V was obtained.

Example 8

The following cell was constructed:

Zn|$ZnCl_2$(0.2)Urea(0.8)|polypyrrole|Pt (wherein "polypyrrole" represents a conducting polypyrrole polymer) and this produced a cell voltage of 1.82 V. This cell has the advantage that an ion selective membrane does not have to be used in the cell.

Example 9

A eutectic that was liquid at room temperature was formed between chromium(III) chloride hexahydrate and urea, using a method analogous to that described in Example 1 above.

Example 10

A eutectic mixture of 7 urea:2 $CrCl_3.6H_2O$ was prepared as described in Example 9 and was found to have voltammetric behaviour indicative of metal deposition. Deposition was found to be possible in mixtures having molar ratios of urea: $CrCl_3.6H_2O$ from 2:1 to 5:1. Negligible current for the reoxidation of chromium was observed except when a small (<5 wt %) concentration of LiCl was added to the liquid. Constant voltage deposition at 3 V and 50° C. for 2 hours produced a 26 μm thick, dull metallic deposit which was shown to be pure chromium by EDAX measurements. The morphology of the deposit is shown in FIG. 4B.

Example 11

The hydrated metal salts SnCl$_2$.2H$_2$O and Zn(NO$_3$)$_2$.6H$_2$O were found, using preparative methods analogous to those described in Examples 1, 9 and 10 above, to form eutectics with urea which had freezing points at or around ambient temperature.

Example 12

A layer of tin (1 micrometer thick) was electrodeposited onto a copper electrode. The electrode was dipped in a 2:9 FeCl$_3$/acetamide eutectic mixture at 80° C. Weight loss of the electrode was monitored over a period of time and it was found that almost all of the tin had been removed from the copper surface in approximately 30 seconds.

The invention claimed is:

1. A mixture having a freezing point of up to 50° C., formed by reaction between two components consisting of:
    (A) one molar equivalent of a salt of formula I

   I or a hydrate thereof; wherein
    M represents one or more metallic elements selected from the group consisting of Mg, Ca, Cr, Mn, Fe, Co, Ni, Cu, Zn, Ga, Ge, In, Sn, Tl, Pb, Cd, Hg and Y,
    X$^-$ is one or more monovalent anions selected from the group consisting of halide, nitrate and acetate and
    n represents 2 or 3; and
    (B) from one to eight molar equivalents of a complexing agent consisting of one or more compounds of formula II and/or formula III,

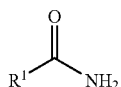   II

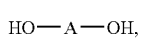   III wherein
    R$^1$ represents H, C$_{1-4}$ alkyl (which latter group is optionally substituted by one or more F atoms), or N(R$^2$)R$^3$;
    R$^2$ and R$^3$ independently represent H or C$_{1-4}$ alkyl (which latter group is optionally substituted by one or more F atoms);
    A represents C$_{2-10}$ alkylene optionally
        (i) substituted by one or more substituents selected from F, OH, SH and N(R$^4$)R$^5$, and/or
        (ii) interrupted by one or more groups selected from O, S and NR$^6$; and
    R$^4$ to R$^6$ independently represent H or C$_{1-4}$ alkyl (which latter group is optionally substituted by one or more substituents selected from F and OH);
    provided that the compound of formula III does not contain any C-atoms that are bonded to more than one atom selected from the group O, S and N, which reaction is performed in the absence of extraneous solvent.

2. A mixture as claimed in claim 1 that has a freezing point of up to 25° C.

3. A mixture as claimed in claim 1, wherein M represents one metallic element selected from the group consisting of Cr, Mn, Fe, Co, Ni, Cu, Zn and Sn.

4. A mixture as claimed in claim 1, wherein:
    (a) when the salt of formula I is anhydrous, the melting point of that salt is 400° C. or less; and
    (b) when the salt of formula I is in the form of a hydrate, the melting point of that salt is 100° C. or less.

5. A mixture as claimed in claim 1, wherein the anion X$^-$ is an anion selected from the group consisting of chloride, nitrate and acetate.

6. A mixture as claimed in claim 1, wherein the complexing agent has a molecular weight of less than 200 g/mol.

7. A mixture as claimed in claim 1, wherein R' represents H, CH$_3$, CF$_3$, NH$_2$, N(H)CH$_3$ or N(CH$_3$)$_2$.

8. A mixture as claimed in claim 1, wherein A represents C$_{2-6}$ n alkylene or C$_{3-4}$ alkylene substituted by one or two OH groups.

9. A mixture as claimed in claim 1, wherein the complexing agent is acetamide, urea, ethylene glycol, 1,3-propanediol, 1,4-butanediol, 1,5-pentanediol, 1,6-hexanediol or glycerol.

10. A mixture as claimed in claim 1, wherein the molar ratio of the salt of formula I, or solvate thereof (component (A)) to the complexing agent (component (B)) is any value in the range from 1:2 to 1:5.

11. A mixture as claimed in claim 1, wherein the reaction between the salt of formula I, or solvate thereof (component (A)), and the complexing agent (component (B)) takes place at 60° C. or above.

12. A mixture as defined in claim 1 further comprising an additive, which additive is introduced after the mixture has formed.

13. A mixture as claimed in claim 12, wherein the additive is selected from the list comprising diluents, electrolytes and brighteners.

14. A method of carrying out an electrolytic reaction, which method comprises employing as a solvent for the electrolytic reaction the mixture defined in claim 1.

15. A method as claimed in claim 14, wherein the reaction is an electroplating or an electropolishing reaction.

16. A method of forming a solution of a solute, which method comprises dissolving the solute in the mixture defined in claim 1.

17. A method of recovering a metal from a metal salt or metal oxide, which method comprises forming a solution of the metal salt or metal oxide in the mixture defined in claim 1, and electrolysing the resulting solution to recover the metal.

18. A method for the electrodeposition of an alloy on a conductive article, the method comprising immersing the article in a mixture as defined in claim 1 in which M represents two or more metallic elements and applying a reducing potential to the article.

19. A method of oxidising a first metal, the method comprising contacting said first metal with a mixture as defined in claim 1 in which M represents one or more metallic elements including at least one metallic element that, when in the form M$^{n+}$, is capable of oxidising the first metal.

* * * * *

UNITED STATES PATENT AND TRADEMARK OFFICE
CERTIFICATE OF CORRECTION

PATENT NO. : 8,518,298 B2  
APPLICATION NO. : 11/994382  
DATED : August 27, 2013  
INVENTOR(S) : Abbott Page 1 of 1

It is certified that error appears in the above-identified patent and that said Letters Patent is hereby corrected as shown below:

In the claims

Col. 11, Line 24, claim 1, delete:

"$(M^{a+})(X^-)_n$"

and insert

--$(M^{n+})(X^-)_n$--.

Col. 12, Line 17, claim 7, delete:

"R'"

and insert

--$R^1$--.

Signed and Sealed this  
Tenth Day of December, 2013

Margaret A. Focarino  
*Commissioner for Patents of the United States Patent and Trademark Office*

UNITED STATES PATENT AND TRADEMARK OFFICE
CERTIFICATE OF CORRECTION

| | | |
|---|---|---|
| PATENT NO. | : 8,518,298 B2 | Page 1 of 1 |
| APPLICATION NO. | : 11/994382 | |
| DATED | : August 27, 2013 | |
| INVENTOR(S) | : Abbott | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1431 days.

Signed and Sealed this
Seventeenth Day of February, 2015

Michelle K. Lee
*Deputy Director of the United States Patent and Trademark Office*